United States Patent [19]

Distler et al.

[11] 4,371,636
[45] Feb. 1, 1983

[54] PREPARATION OF COPOLYMER DISPERSIONS HAVING A NARROW PARTICLE SIZE DISTRIBUTION, AND EXHIBITING DILATANT FLOW OVER A BROAD RANGE OF CONCENTRATIONS

[75] Inventors: Dieter Distler, Mutterstadt; Hans Wolf, Ludwigshafen; Gerhard Welzel, Mannheim, all of Fed. Rep. of Germany

[73] Assignee: BASF Aktiengesellschaft, Ludwigshafen, Fed. Rep. of Germany

[21] Appl. No.: 279,548

[22] Filed: Jul. 1, 1981

[30] Foreign Application Priority Data

Jul. 5, 1980 [DE] Fed. Rep. of Germany ....... 3025562

[51] Int. Cl.$^3$ ............................................. C08L 35/06
[52] U.S. Cl. .................................. 523/223; 524/560; 524/564; 524/832; 524/833; 524/556
[58] Field of Search ................... 260/29.6 H, 29.6 TA; 524/556, 832, 833; 523/223

[56] References Cited

U.S. PATENT DOCUMENTS

| | | | |
|---|---|---|---|
| 3,075,939 | 1/1963 | Bauer, Jr. et al. | 260/30.4 |
| 3,770,679 | 11/1973 | Corey et al. | 260/29.6 TA |
| 3,770,680 | 11/1973 | Iacoviello | 260/29.6 TA |
| 3,784,498 | 1/1974 | Ceska | 260/29.6 TA |
| 4,051,093 | 9/1977 | Wendel et al. | 260/29.6 TA |
| 4,061,833 | 12/1977 | Pelletier et al. | 428/511 |

*Primary Examiner*—Joseph L. Schofer
*Assistant Examiner*—Bernard Lipman
*Attorney, Agent, or Firm*—Oblon, Fisher, Spivak, McClelland & Maier

[57] ABSTRACT

A process for the preparation of copolymer dispersions having a narrow particle size distribution, and exhibiting dilatant flow over a broad range of concentrations, by emulsion copolymerization of from 1 to 10% by weight, based on total monomers, of $\alpha,\beta$-monoolefinically unsaturated monocarboxylic acids and/or dicarboxylic acids with other monoolefinically unsaturated monomers and with from 0 to 5% by weight of polyolefinically unsaturated monomers in the presence of conventional emulsifiers, dispersants and polymerization initiators, and in the presence or absence of regulators, wherein the monomers are copolymerized in aqueous emulsion, with simultaneous agglomeration but only partial fusion of the initially formed polymer particles, at a temperature near the glass transition temperature of the copolymer formed, and thereafter (A) the copolymer content of the aqueous copolymer dispersion is brought to 35–55% by weight and the pH to 3–5 or (B) the water contained in the aqueous copolymer dispersion is entirely or partially replaced by a water-miscible liquid which does not dissolve or swell the copolymer.

6 Claims, No Drawings

PREPARATION OF COPOLYMER DISPERSIONS HAVING A NARROW PARTICLE SIZE DISTRIBUTION, AND EXHIBITING DILATANT FLOW OVER A BROAD RANGE OF CONCENTRATIONS

Copolymer dispersions are described as exhibiting dilatant flow if they thicken under the action of shearing forces, ie. if their viscosity increases with increasing rate of shear, unaccompanied by a measureable time dependence. This thickening under shear is reversible and isothermal. In a dispersion exhibiting dilatant flow, a particular shearing force corresponds to a particular viscosity. This thickening under shear can be accompanied by a increase in volume, and it is this which is the origin of the description "dilatant", but such an increase need not necessarily occur.

W. K. Bauer and F. A. Collins, in "Rheology" (Acad. Press, Vol. 4, page 724 et seq.) describe many examples of dilatant systems and mention, as causes for their dilatancy, reasons which are in part contradictory. For example, they give, as reasons, both particularly high stability of the systems and particularly low stability of the systems, and both aggregation under shear and localized drying-out. The dilatant systems of the prior art are either dilatant only over a very narrow range of solids content, for example from 59.5 to 61% by weight, or have inadequate shelf life, for example in the case of certain pigment dispersions. Furthermore, in many cases thickening only occurs at very high shearing rates.

British Pat. No. 1,217,446 discloses a dilatant latex which is obtained by emulsion polymerization. The polymerization must be carried out in the presence of a polyhydric alcohol which is water-soluble but is insoluble, or virtually insoluble, in the latex polymer product. The latex is intended to be used for coating agents. It is stated that the latex is prepared from monoolefinically unsaturated esters of 4 to 7 carbon atoms together with monoolefinically unsaturated esters of 5 to 13 carbon atoms and from 1 to 5% by weight, based on total monomers, of an aliphatic monoolefinically unsaturated carboxylic acid of 3 or 4 carbon atoms. However, the latices obtained by this process contain coagulate and, after filtration, fail to show dilatant behavior up to a shearing rate of 500 sec$^{-1}$.

We have found that copolymer dispersions having a narrow particle size distribution and exhibiting dilatant flow over a broad range of concentrations can advantageously be prepared by emulsion copolymerization of from 1 to 10% by weight, based on total monomers, of $\alpha,\beta$-monoolefinically unsaturated monocarboxylic acids and/or dicarboxylic acids with other monoolefinically unsaturated monomers and with from 0 to 5% by weight of polyolefinically unsaturated monomers in the presence of conventional emulsifiers, dispersants and polymerization initiators, and in the presence or absence of regulators, if the monomers are copolymerized in aqueous emulsion, with simultaneous agglomeration but only partial fusion of the initially formed polymer particles, which have a particle diameter of from 50 to 200 nm, at a temperature near the glass transition temperature of the copolymer formed, and thereafter (A) the copolymer content of the aqueous copolymer dispersion formed is brought to 35–55% by weight and the pH to 3–5, unless these values already obtain, or (B) the water contained in the aqueous copolymer dispersion formed is entirely or partially replaced by a water-miscible liquid which does not dissolve or swell the copolymer.

In the novel process, the $\alpha,\beta$-monoolefinically unsaturated monocarboxylic acids and/or dicarboxylic acids are preferably employed in amounts of from 2 to 10% by weight, based on total monomers. Suitable carboxylic acids are especially monocarboxylic acids and dicarboxylic acids of 3 or 4 carbon atoms, e.g. acrylic acid, methacrylic acid, maleic acid, itaconic acid and fumaric acid, as well as monoesters of such dicarboxylic acids with alkanols, generally of 1 to 4 carbon atoms, e.g. monomethyl maleate, monoethyl fumarate and n-butyl itaconate. The monocarboxylic acids and dicarboxylic acids (including the half-esters) of the stated type in general are of 3 to 9 carbon atoms. Acrylic acid, methacrylic acid and maleic acid are of particular interest.

The other monoolefinically unsaturated monomers to be used can be, quite generally, those which give water-insoluble homopolymers. Monomers of this type are, in particular, monoolefinically unsaturated carboxylic acid esters of 1 to 4 carbon atoms, especially esters of acrylic acid and methacrylic acid with alkanols of 1 to 10, especially 1 to 4 carbon atoms, as well as vinyl esters of straight-chain or branched aliphatic carboxylic acids, the acids generally being of 2 to 12 carbon atoms. Examples of such olefinically unsaturated esters are, in particular, the esters of acrylic acid and methacrylic acid with methanol, ethanol, n-propanol, n-butanol, isobutanol, tert.-butanol and 2-ethylhexyl alcohol, especially ethyl acrylate, ethyl methacrylate, n-butyl acrylate, n-butyl methacrylate, isobutyl acrylate, isobutyl methacrylate and methyl methacrylate. Suitable vinyl esters are, in particular, vinyl acetate, vinyl propionate and vinyl n-butyrate. Styrene is also of great interest as a monoolefinically unsaturated monomer. Acrylonitrile can also be used as a comonomer, in amounts of up to 10% by weight, based on total monomers. Other suitable monoolefinically unsaturated monomers are vinyl halides, e.g. vinyl chloride and vinylidene chloride. By way of example, a monomer mixture of particular interest for the preparation of the dilatant dispersions comprises (a) from 2 to 10% by weight of the $\alpha,\beta$-monoolefinically unsaturated monocarboxylic acid and/or dicarboxylic acid, (b) from 0 to 98% by weight of acrylic acid esters or methacrylic acid esters of alkanols of 1 to 4 carbon atoms, (c) from 0 to 98% by weight of styrene and/or methyl methacrylate and (d) from 0 to 3% by weight of polyolefinically unsaturated monomers, the amount of the monomers (b) and (c) together being 90–98% by weight. Such a mixture can advantageously be copolymerized at from 60° to 95° C. in aqueous emulsion in the presence of from 0 to 0.5% by weight of anionic emulsifiers and from 0 to 1% by weight of non-ionic emulsifiers, the percentages being based on the amount of monomers.

The conventional emulsifiers are dispersants can generally be used for the process, for example alkali metal salts and ammonium salts of $C_{12}$–$C_{18}$-alkylsulfonates and of $C_{12}$–$C_{18}$-alkyl-sulfates, oxyalkylated, especially oxyethylated and/or oxypropylated, alkylphenols, where alkyl is of 8 to 12 carbon atoms, or oxyalkylated fatty alcohols of 12 to 18 carbon atoms, the products containing from 5 to 50 alkylene oxide radicals per molecule. The polymerization initiators employed are those conventionally used for emulsion polymerizations; examples of suitable initiators are ammonium salts and alkali metal salts of peroxydisulfuric acid, hydrogen peroxide and cumene hydroperoxide.

In general, it is not necessary to employ regulators in carrying out the process, but in some cases the use of small amounts of conventional regulators, for example tert.-dodecylmercaptan, can be advantageous.

The novel emulsion copolymerization process is intended to be carried out in such a way that the primary polymer particles first formed partially fuse with one another when they have a particle diameter of from 5 to 200 nm. This is a special type of agglomeration of the copolymer particles first formed, and is made possible by keeping the polymerization batch, during this stage, near the glass transition temperature of the copolymer formed. In general, the temperature can, for this purpose, be up to about 10° C. above or below the glass transition temperature, i.e. the polymerization temperature range is about ±10° C. around the glass transition temperature of the copolymer formed. The degree of permitted deviation from the latter temperature depends on the viscosity of the particular copolymer particles and can be the greater, the higher the viscosity of the copolymer particles first formed. The choice of temperature is intended to ensure that complete fusion of the copolymer particles first formed does not take place. (The glass transition temperature of the copolymer system can easily be calculated from the known glass transition temperatures of the homopolymers, with due allowance for the fact that the glass transition temperatures of the polymer particles formed are lowered by the monomers present. Glass transition temperatures are to be found, for example, in the Polymer Handbook by Brandrup and Immergut, Interscience Publ. New York, N.Y. 1967). Accordingly, the emulsion copolymerization carried out in accordance with the invention gives agglomerated copolymer particles which have a very uneven irregular surface. This shape of the particles remains preserved even if further monomers are polymerized in a dilatant polymer dispersion prepared according to the invention.

The conditions for the agglomeration of the copolymer particles first formed are known per se. In the process according to the invention, the content of monoolefinically unsaturated monocarboxylic acids and/or dicarboxylic acids is one of the factors. As an example of an additional measure, the amount of emulsifier used in carrying out the emulsion copolymerization can be kept relatively low. It is also possible to add, during the copolymerization, additives which cause agglomeration, for example copolymers of ethylene oxide and propylene oxide, having cloud points near the polymerization temperature, or high molecular weight oxidized polyethylene oxides.

If the emulsion copolymerization of the monomers is initiated in a conventional manner, particles of diameter from 5 to 200 nm are first formed in the course of 50-80% of the total polymerization time or, if an emulsion feed process is employed, after the addition of 50-80% of the monomer emulsion to the aqueous phase. A particularly marked dilatant behavior is exhibited by polymer dispersions, prepared by the novel process, in which the copolymer particles first formed have a particle diameter of 50-100 nm when they are about to undergo partial fusion. The light transmission (light scattering) measured during the copolymerization can serve as a measure of the particle diameter of the primary copolymer particles.

The aqueous copolymer emulsions prepared in the manner described above are only dilatant, per se, if their copolymer content is 35-55% by weight, based on the dispersion, and their pH is less than 5. If, on the other hand, the copolymer content or the pH are outside these ranges, the content must be adjusted by adding water or by concentrating, and the pH must be adjusted by addition of dilute alkalis, if a dilatant aqueous copolymer dispersion is to be obtained.

If, however, it is preferred—and this is advantageous for certain types of application—to prepare a non-aqueous copolymer dispersion exhibiting dilatant flow, it is not necessary to adjust the concentration range and pH range and instead the water contained in the aqueous copolymer dispersion can be partially or completely replaced by a water-miscible liquid which does not dissolve or swell the copolymer. Advantageous liquids of this type include formamide, ethylene glycol, diethylene glycol, triethylene glycol and glycerol. Amongst these, ethylene glycol and diethylene glycol are preferred. After having added the amount of such liquid required to adjust the solids content, the water can be completely or partially removed by evaporation, leaving a dispersion which exhibits dilatent flow.

Finally, it is also possible to remove the water, by freeze drying or spray drying, from the aqueous copolymer dispersion first prepared, and then to disperse the resulting copolymer powder in a liquid which does not dissolve or swell the copolymer. This, however, is only possible if the glass transition temperature of the copolymer is substantially above room temperature and above the drying temperature used.

Using the novel process, dilatant copolymer dispersions having a narrow particle size distribution are obtained; in these dispersions, the ratio of the weight-average of the particles to the number-average should in general be from 1 to 1.2, especially from 1 to 1.1. The copolymer content of the novel dispersion should preferably be from 40 to 55% by weight. For most applications, the monomer composition is chosen to give a copolymer having a glass transition temperature of above 50° C. By additionally using polyolefinically unsaturated monomers (d)—suitable monomers are, in particular, ethylene glycol diacrylate and dimethacrylate, butane-1,4-diol diacrylate and dimethacrylate, trimethylolpropane triacrylate and trimethacrylate and divinylbenzene-coalescence of the agglomerating particles is made more difficult, since crosslinks are introduced into the polymer particles. Instead of the polyolefinically unsaturated monomers of the stated type, it is also possible, in some cases, to employ monomers which additionally to an olefinic double bond contain another reactive group. Examples of such comonomers are N-methylolacrylamide, N-methylolmethacrylamide, glycidyl acrylate and glycidyl methacrylate.

The degree to which a copolymer dispersion prepared by the process according to the invention can be thickened by shearing depends on its solids content. As the solids content increases, the critical shearing rate, i.e. the minimum shearing rate at which the viscosity of the dispersion increases under shear, decreases. In general, the range of critical shearing rates of the copolymer dispersions obtained by the novel process is from 0.5 to 500 sec$^{-1}$.

The copolymer dispersions prepared by the novel process are very stable, have a good shelf life, and exhibit highly dilatant flow. They can be used, for example, in the production of sports shoe pads, especially ski boot pads, hydraulic clutches, shock-absorber fillings and speed governors, as well as for armoring of vehicles and for filling orthopedic cushions.

In the Examples which follow, parts and percentages are by weight.

EXAMPLE 1

420 parts of water are mixed, in a receiver, with 140 parts of feed I and 18 parts of feed II and the mixture is heated, with stirring, to 85° C., at which temperature the polymerization starts. The remainder of feeds I and II is then run in uniformly in the course of 3 hours, and polymerization is subsequently continued at 85° C.

Feed I 450 parts of styrene, 500 parts of tert.-butyl acrylate, 20 parts of maleic acid, 30 parts of methacrylamide, 348 parts of water, 15 parts of sodium laurylsulfonate (20% strength aqueous solution) and 25 parts of a conventional 25:1 adduct of ethylene oxide with isooctylphenol (20% strength aqueous solution).

Feed II 7 parts of potassium peroxydisulfate and 180 parts of water.

The resulting dispersion, whilst still hot, is diluted to a solids content of about 40% and brought to a pH of from 3 to 4.5 by adding ammonia.

Instead of diluting with water and adjusting the pH, it is also possible to dilute with 1,000 parts of ethylene glycol and then to distil off all or part of the water, if appropriate under reduced pressure.

In both cases, a copolymer dispersion having a narrow particle size distribution and exhibiting highly dilatant flow is obtained.

At room temperature, the critical shearing rate $D_{crit}$ of the dispersion depends on the pH of the latter, the values for a 48% strength aqueous dispersion being as follows:

| $D_{crit}(\sec^{-1})$ | pH |
|---|---|
| 50 | 3.8 |
| 70 | 3.85 |
| 100 | 3.95 |
| 180 | 4.32 |
| 320 | 4.46 |
| 500 | 4.5 |

The critical shearing rate of the 48% strength aqueous dispersion, at pH 4.24, increases with temperature as follows:

| $D_{crit}(\sec^{-1})$ | T °C. |
|---|---|
| 50 | 10 |
| 140 | 21 |
| 220 | 25 |
| 400 | 41 |

EXAMPLE 2

A mixture of 24 parts of water, 7 parts of feed I and 1 part of feed II is heated to 80° C. in a receiver, and kept at this temperature for 15 minutes (to start the polymerization). The remainder of feeds (I) and (II) is then added in the course of 2½ hours, after which polymerization is continued for a further hour at 80° C.

Feed I 40 parts of styrene, 6 parts of ethyl acrylate, 1.5 parts of acrylic acid, 1.5 parts of methacrylamide, 1 part of maleic acid and 0.375 part of sodium laurylsulfate (40% strength aqueous solution).

Feed II 8 parts of water and 0.35 part of potassium peroxydisulfate.

After completion of the polymerization, the procedure described in Example 1 is followed.

The 50% strength diethylene glycol-containing dispersion obtained after replacing the water by diethylene glycol by the second procedure of Example 1 has a low viscosity; its critical shearing rate is about 5 sec$^{-1}$ at room temperature and 100 sec$^{-1}$ at 50° C.

EXAMPLE 3

The procedure described in Example 2 is followed, except that 0.5 part of butane-1,4-diol diacrylate is added to feed I when half of this feed has already been added to the polymerization batch. Thereafter the procedure described earlier is followed, and a dilatant copolymer dispersion is obtained.

The diethylene glycol-containing dispersion obtained, at a polymer content of 45%, has a critical shearing rate of 15 sec$^{-1}$ at room temperature, 200 sec$^{-1}$ at 40° C. and 480 sec$^{-1}$ at 50° C.

We claim:

1. A process for the preparation of copolymer dispersions having a narrow particle size distribution, and exhibiting dilatant flow over a broad range of concentrations, which comprises emulsion copolymerization of (a) from 2 to 10% by weight, based on total monomers, of a,b-monoolefinically unsaturated monocarboxylic acids or dicarboxylic acids (b) from 0 to 98% by weight of acrylic acid esters or methacrylic acid esters of alkanols of 1 to 4 carbon atoms, (c) from 0 to 98% by weight of styrene or methyl methacrylate; and (d) from 0 to 3% by weight of polyolefinically unsaturated monomers; the amount of the monomers (b) and (c) together being from 90 to 98% by weight, at 60°-95° C., in the presence of from 0 to 0.5% by weight of an anionic emulsifier and from 0 to 1% by weight of a non-ionic emulsifier, the percentages being based on the weight of monomers, with simultaneous agglomeration but only partial fusion of the initially formed polymer particles, which have a diameter of from 5 to 200 nm, at a temperature of ±10° C. of the glass transition temperature of the copolymer formed, and thereafter adjusting the copolymer content of the aqueous copolymer dispersion formed to 35-55% by weight and the pH to 3.8-5.0, unless these values already obtain.

2. A process for the preparation of copolymer dispersions having a narrow particle size distribution, and exhibiting dilatant flow over a broad range of concentrations, which comprises copolymerization of (a) from 2 to 10% by weight, based on total monomers, of a,b-monoolefinically unsaturated monocarboxylic acids or dicarboxylic acids (b) from 0 to 98% by weight of acrylic acid esters or methacrylic acid esters of alkanols of 1 to 4 carbon atoms, (c) from 0 to 98% by weight of styrene or methyl methacrylate; and (d) from 0 to 3% by weight of polyolefinically unsaturated monomers; the amount of the monomers (b) and (c) together being from 90 to 98% by weight, at 60°-95° C., in the presence of from 0 to 0.5% by weight of an anionic emulsifier and from 0 to 1% by weight of a non-ionic emulsifier, the percentages being based on the weight of monomers, with simultaneous agglomeration but only partial fusion of the initially formed polymer particles, which have a diameter of from 5 to 200 nm, at a temperature of ±10° C. of the glass transition temperature of the copolymer formed, and thereafter entirely or partially replacing the water contained in the aqueous copolymer dispersion formed by a water-miscible liquid which does not dissolve or swell the copolymer.

3. A copolymer dispersion having a narrow particle size distribution and exhibiting dilatant flow over a broad range of concentrations prepared by the processes of claim 1 or 2.

4. The dilatant copolymer dispersions of claim 3 wherein the ratio of the weight average of the particles to the number average is in the range of from 1 to 1.2.

5. The dilatant copolymer dispersion of claim 3 wherein said copolymer has a glass transition temperature of above 50° C.

6. The dilatant copolymer dispersion of claim 3 wherein the range of critical shearing rates of the copolymer of the dispersion ranges from 0.5 to 500 sec$^{-1}$.

* * * * *